No. 811,215. PATENTED JAN. 30, 1906.
M. GOLDSMITH.
BAG HANDLE.
APPLICATION FILED JAN. 10, 1905.
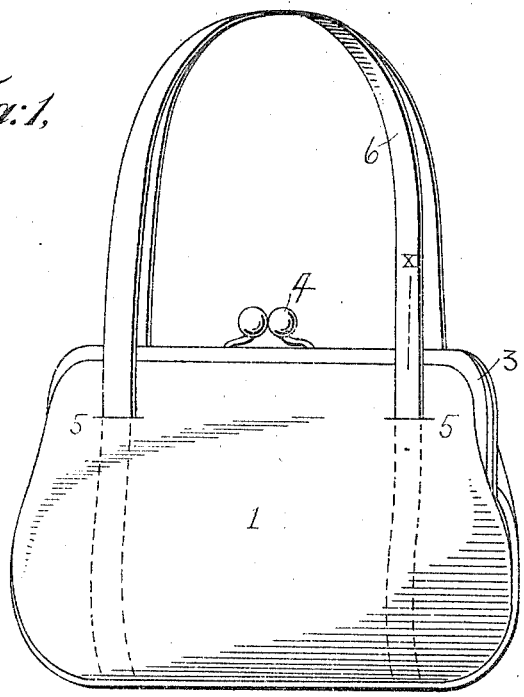
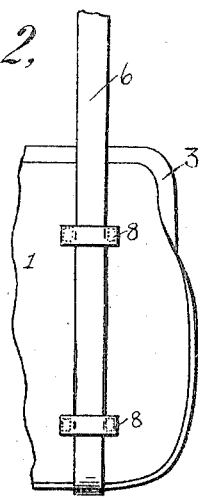
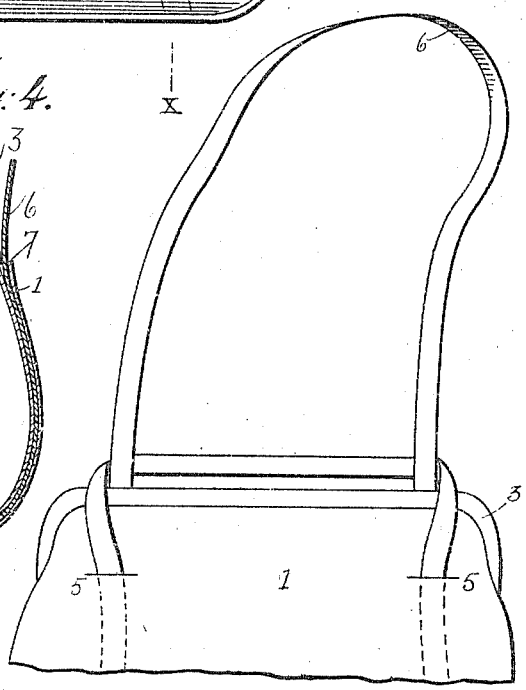
Witnesses:
Max B. A. Doring.
Frank F. Wimmel.
Maurice Goldsmith, Inventor:
By his Attorney Robt. B. Killgore.

UNITED STATES PATENT OFFICE.

MAURICE GOLDSMITH, OF NEW YORK, N. Y.

BAG-HANDLE.

No. 811,215.	Specification of Letters Patent.	Patented Jan. 30, 1906.

Application filed January 10, 1905. Serial No. 240,499.

*To all whom it may concern:*

Be it known that I, MAURICE GOLDSMITH, a citizen of the United States, and a resident of the city, county, and State of New York, have invented a new and useful Improvement in Bag-Handles, of which the following is a specification.

My invention relates to a bag-handle which is slidably secured to the bag and is capable of use as a short double-loop handle or as a long single-loop handle and which may at the same time constitute the means for securing the bag in closed condition. I attain these objects in the manner illustrated in the accompanying drawings, in which—

Figure 1 is a view of the bag with the handle in position for use as a short double-loop handle. Fig. 2 shows a modification of the method of slidably securing the handle to the bag. Fig. 3 shows the handle in position for use as a long single-loop handle and also interlocked to secure the bag in closed condition. Fig. 4 is a sectional view on the line $x$ $x$ of Fig. 1 and shows the method of disposing the band forming the handle between the outer covering of the bag and the lining.

Similar reference characters refer to similar parts throughout the several views.

The bag proper may be of any desired sort and generally comprises the outer cover 1, the lining 2, and the frame 3. This frame may be provided with fastening devices 4.

In the preferred form the handle is made and secured to the bag in the following manner: Suitable openings 5 5 and 7 7 are made in each side of the outer cover 1 of the bag near the frame and near each end thereof. The handle 6 is formed, preferably, of a band which passes through the opening 5 on one side from the outside, then between the lining 2 and the outer cover 1, to and through the slot 7 on the other side, then through the openings in the cover at the other end of the bag, and around it in like manner. The ends of the band are secured together in any suitable manner. The band 6 thus forms a double-loop handle, which is slidably connected with and conforms to the shape of the bag.

If desired, the band 6, forming the handle, may be slidably secured to the bag by means of the short straps 8, secured to the outside of the cover thereof, as shown in Fig. 2.

The operation of the device is as follows: If a short handle is desired, the band is left in the form of the two loops (shown in Fig. 1) and the hand grasps both loops. If a long handle is desired, one of the loops is pulled upon, thereby sliding the other loop around the bag until it interlocks, assuming the position shown in Fig. 3, when the bag may be slung over the shoulder by the long loop.

The locking device 4 may be dispensed with, as the double loops in Fig. 1 or the interlocked loops in Fig. 3 are sufficient to hold the bag in closed condition.

Having thus described my invention, what I claim as new, and desire to secure by Letters Patent, is—

A bag comprising a frame, an outer cover having openings therein near the ends thereof, and an inner lining, a handle formed of a band or loop passing through the openings and vertically around the bag between the cover and lining, and free to slide therein whereby the band or loop may be used either as a short, double handle or interlocked and used as a long single handle, substantially as described.

In testimony whereof I have hereunto set my hand, this 7th day of January, 1905, in the presence of two subscribing witnesses.

MAURICE GOLDSMITH.

Witnesses:
S. LOESER,
ROBT. B. KILLGORE.